Jan. 6, 1931.  J. A. MONTGOMERY  1,787,698
CONSTRUCTION OF ZEOLITE WATER SOFTENERS
Filed Sept. 14, 1928
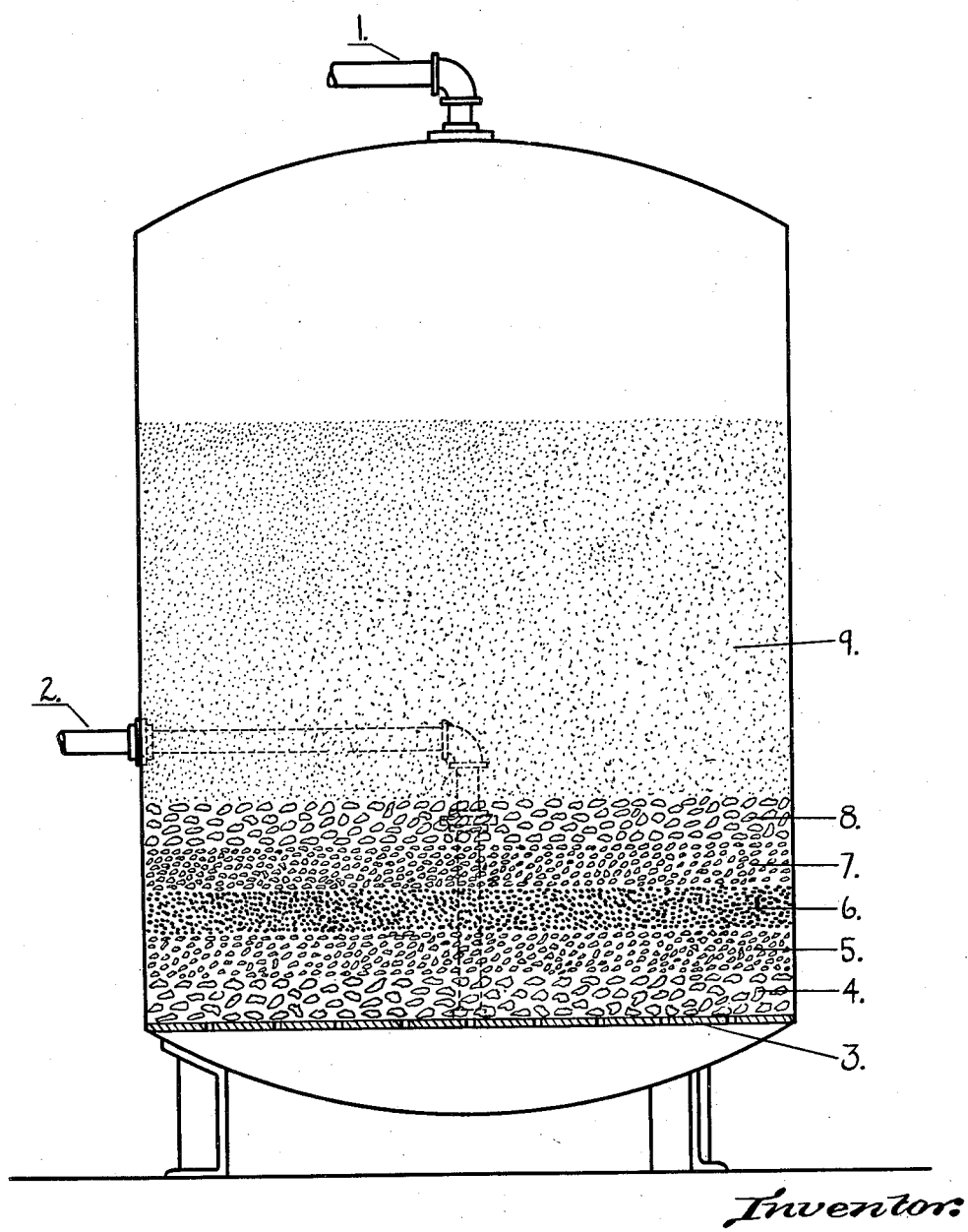
Inventor:
John Arthur Montgomery
By
R.H. Galbraith
Attorney Patented Jan. 6, 1931

1,787,698

UNITED STATES PATENT OFFICE

JOHN ARTHUR MONTGOMERY, OF DENVER, COLORADO

CONSTRUCTION OF ZEOLITE WATER SOFTENERS

Application filed September 14, 1928. Serial No. 305,941.

My invention relates to the manner in which the supporting bed of gravel or other similar material is placed in the bottom of zeolite water softeners, thus improving the operating efficiency of such machines, more particularly to a means of eliminating the rupturing, blowing or disarranging of said supporting bed, and above which is placed the zeolite mineral or water softening agent. This invention applies to either the upward or downward flow type of zeolite water softener also to either pressure or open type zeolite softener.

It is common practice in the construction of zeolite water softeners, of either the open or closed type, to place a gravel bed in the base of the softener. This gravel bed within the softener shell serves as a support or base on top of which is placed the zeolite or water softening material. The gravel bed is placed either on top of a perforated plate in the base of the softener, or around and over a system of pipes, which plate or pipes serve as a collecting or distributing system for the water. To date much trouble has come from the fact that when water is passing up through the gravel supporting bed, the water has a tendency to channel and disarrange the gravel so that when water or brine is afterwards passed downward through the gravel bed, the zeolite mineral also passes down through this weakened portion of the gravel bed and on out of the softener. Many methods have been tried for overcoming this serious trouble but they have proved unsuccessful.

It is common practice to use more than one size of gravel in the supporting bed. Large gravel is usually used for the bottom or lowest layer of the supporting bed. On top of this layer of coarse gravel is then placed finer gravel. It is customary to place from two to three layers of finer gravel on top of the coarse gravel. The top or final layer of gravel is usually quite fine, running from one half inch and down. This top layer of gravel is the layer that really holds the zeolite and prevents it from passing downward through the coarser layers. When this top layer has been broken it is easy for the mineral to pass down through the lower layers and be lost.

When a gravel bed has become disarranged and the bed has one or more weak spots a channeling condition is produced when the water is passing either upward or downward through the machine. In the case of upward flow water softeners such a channel would greatly reduce the total softening capacity of the machine per each regeneration since hard water would be delivered long before all of the zeolite mineral has been brought into action. This is due to the fact that most of the water would flow upward through the channel in the gravel bed rather than be evenly distributed through the entire volume of gravel bed and zeolite mineral above the gravel bed.

This invention refers particularly to a method of superimposing heavier gravel on top of the finest layer of gravel that has heretofore been used in the supporting bed or on top of the finest layer of gravel that might hereafter be used in the supporting bed. The invention also refers to any other granulated substance that might be substituted for gravel.

In the following detailed description of the invention reference is had to the accompanying drawing which forms a part hereof. Like numerals refer to like parts in all views of the drawings and throughout the description.

Referring to the drawing, which is a vertical cross section view of a zeolite water softener of the enclosed type, 1 indicates one of the water connections and 2 the other water connection. In the case of the downward flow machine 1 would be the inlet and 2 the outlet; whereas, in the case of the upward flow softener 2 would be the inlet and 1 the outlet. These connections are placed at various places on the tank.

In the base of the container is placed a collecting system 3 in this case indicated by a perforated plate. On this plate is placed the first layer of coarse gravel 4 usually three quarters of an inch in diameter or larger. On top of this first layer of gravel may be placed a second layer of smaller gravel indicated by 5. On top of this second layer of gravel is placed the fine gravel 6 which serves as the real supporting bed for the softening mineral 9. It is this layer of gravel 6 which has become disarranged in the past and allowed the mineral to leak out of the softener downward, or in the case of upward flow and upward salting, has caused a channeling through the mineral bed. To prevent this, I propose to weigh down the fine layer of gravel 6 by superimposing on the fine gravel, one or more layers of coarser gravel or by the use of any other granulated material which would serve the same purpose. To obtain the best results, I recommend that two layers of gravel be placed upon the layer of fine gravel 6. The size of the gravel in layer 7 can very well be the same as is used in layer 5 and the gravel in layer 8 can be the same as is used in layer 4.

The two upper layers of gravel 7 and 8 will not prevent the softening mineral from reaching the real supporting bed 6 but by holding the fine gravel in layer 6 in place with the superimposed layers of coarser gravel, it will not be possible to produce a blown or disarranged bed in layer 6, and thus permit the mineral to leak downward out of the machine or to produce a channel in the upward flow type of softener.

This method of holding the real supporting layer 6 of gravel in place, by means of the superimposed layers of one or more layers of coarse gravel might easily be accomplished by using materials other than gravel on top of layer 6 and my invention is not confined to the use of gravel but includes any other granulated material that might be used instead of gravel.

While a specific form of the improvement has been described and illustrated herein, it is desired to be understood that the same may be varied, within the scope of the appended claims, without departing from the spirit of the invention.

What I claim is:

1. In a zeolite water softener of the type having a bed of non-buoyant, granular material for supporting said zeolite, means for preventing blowing of said bed comprising: a layer of relatively non-buoyant, granular material relatively coarser than the granular material in said bed covering the entire top thereof.

2. In a zeolite water softening tank of the type described having a bed of granular material for supporting said zeolite, comprising a layer of coarse gravel in the bottom of said tank, a layer of fine gravel above said coarse gravel, and a layer of non-buoyant granular material relatively coarser than said fine gravel covering the entire top of said bed.

JOHN ARTHUR MONTGOMERY.